US010426678B2

(12) United States Patent
    Tamney

(10) Patent No.: US 10,426,678 B2
(45) Date of Patent: Oct. 1, 2019

(54) CHILD SUPPORT STRUCTURE

(71) Applicant: Cathryn Tamney, Frisco, TX (US)

(72) Inventor: Cathryn Tamney, Frisco, TX (US)

( * ) Notice: Subject to any disclaimer, the term of this patent is extended or adjusted under 35 U.S.C. 154(b) by 0 days.

(21) Appl. No.: 15/970,410

(22) Filed: May 3, 2018

(65) Prior Publication Data

US 2018/0333316 A1    Nov. 22, 2018

Related U.S. Application Data

(60) Provisional application No. 62/507,543, filed on May 17, 2017.

(51) Int. Cl.

| *A61G 5/14* | (2006.01) |
| *A61G 5/10* | (2006.01) |
| *A61G 7/10* | (2006.01) |
| *A61H 3/00* | (2006.01) |
| *A61H 1/02* | (2006.01) |
| *A47D 15/00* | (2006.01) |
| *A63F 13/807* | (2014.01) |
| *A63F 13/98* | (2014.01) |

(52) U.S. Cl.
    CPC ............ *A61G 5/14* (2013.01); *A47D 15/005* (2013.01); *A61G 5/1059* (2013.01); *A61G 7/1059* (2013.01); *A61H 1/0229* (2013.01); *A61H 3/008* (2013.01); *A63F 13/807* (2014.09); *A63F 13/98* (2014.09); *A61G 2200/14* (2013.01); *A61G 2200/36* (2013.01); *A61G 2200/50* (2013.01); *A61H 2003/007* (2013.01)

(58) Field of Classification Search
    CPC .. A61G 5/14; A61G 2200/14; A61G 2200/36; A61G 5/1059; A61H 3/008; A61H 3003/007; A61H 2/008; A61H 1/0229; A47D 15/005
    USPC ................ 297/273, 275; 135/67; 280/87.051
    See application file for complete search history.

(56) References Cited

U.S. PATENT DOCUMENTS

| 1,551,932 A | * | 9/1925 | Carver ................ A47D 15/006 |
| | | | 297/466 |
| 2,591,875 A | * | 4/1952 | Robbins ............... A47D 15/006 |
| | | | 297/466 |
| 4,621,804 A | * | 11/1986 | Mueller ............... A47D 13/043 |
| | | | 135/67 |
| 5,058,912 A | * | 10/1991 | Harroun .................. A61H 3/04 |
| | | | 135/67 |

(Continued)

Primary Examiner — Milton Nelson, Jr.
(74) Attorney, Agent, or Firm — Culhane Meadows PLLC; Robert C. Klinger

(57) ABSTRACT

A support device created for children having a disability limiting their ability to stand-alone for extended periods of time, for those who are a fall risk, and for those with any physical or intellectual disability. The device has a frame that gives stability to the whole member. A seat is positioned in the middle of the frame for a child to use as a place to rest when desired, where the seat can catch the child if the child stumbles or falls. The seat is configured to be positioned below the child's torso when the child is standing as a safety support. This allows the child to stand, such as to watch TV, or stand on a movable game hoard of a video game system. The frame has a member that can be selectively removed or retracted such that the child can walk into the frame. Ankle restraints are provided and configured to attach to the child and keep the child's feet inside of the device and below the child.

15 Claims, 2 Drawing Sheets

FIG. 1

(56) References Cited

U.S. PATENT DOCUMENTS 8,720,914 B1 * 5/2014 Heath ...................... A61H 3/04
                                                    135/67
9,278,042 B2 * 3/2016 Osterhaus ................ A61H 3/04

* cited by examiner

CHILD SUPPORT STRUCTURE

CLAIM OF PRIORITY

This application claims priority of U.S. Provisional Patent Application U.S. Ser. No. 62/507,543 entitled Child Support Structure filed May 17, 2017, the teaching of which are incorporated herein by reference.

BACKGROUND

This disclosure is directed child support member configured to support a child physical and/or intellectual disability such as over a movable video game board.

SUMMARY

A support device created for children having a disability limiting their ability to stand-alone for extended periods of time, for those who are a fall risk, and for those with any physical or intellectual disability. The device has a frame that gives stability to the whole member. A seat is positioned in the middle of the frame for a child to use as a place to rest when desired, where the seat can catch the child if the child stumbles or falls. The seat is configured to be positioned below the child's torso when the child is standing as a safety support. This allows the child to stand, such as to match TV, or stand on a movable game board of a video game system. The frame has a member that can be selectively removed or retracted such that the child can walk into the frame. Ankle restraints are provided and configured to attach to the child and keep child's feet inside of the device and below the child.

DETAILED DESCRIPTION

This disclosure comprises a support device created for children having a disability limiting their ability to stand-alone for extended periods of time, for those who are a fall risk, and for those with any physical or intellectual disability. The device has a frame that gives stability to the whole member. A seat is positioned in the middle of the frame for a child to use as a place to rest when desired, where the seat can catch the child if the child stumbles or falls. The seat is configured to be positioned below the child's torso when the child is standing as a safety support. This allows the child to stand, such as to watch TV, or stand on a movable game board of a video game system, such as the rocker board of a Wii® system manufactured by Nintendo®. Ankle restraints are provided and can be used on a child with spasticity, or a child who does not have full control over his/her legs. The ankle restraints are configured to attach to the child and keep the child's feet inside of the device and below the child.

Figure 1:
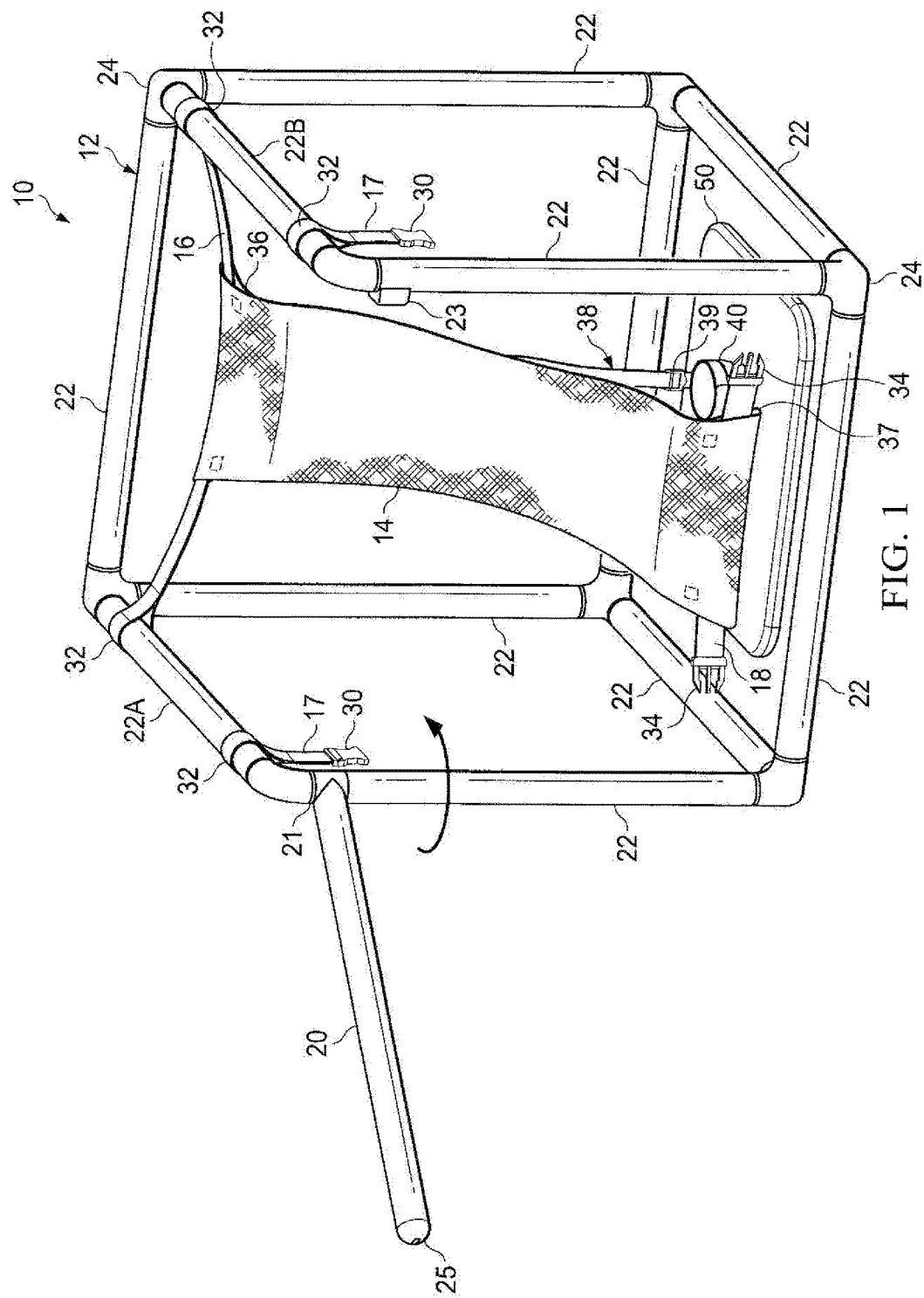
FIG. 1 illustrates a child support device having a member that can be selectively removed or retracted such that the child can walk into the frame, where ankle restraints are configured to attach to the child's ankles to keep the child's feet inside of the device and below the child.

Referring to FIG. 1, there is shown a top perspective view of a support device generally shown at 10, including a frame generally shown at 12, a sling type seat 14 positioned generally in the center of the frame 12 and suspended from the frame 12 by a plurality of belts 16, 17, and 18. The seat 14 and the belts 16, 17 and 18 collectively form a harness. Advantageously, the frame 12 has a selectively retractable/removable top front member 20 configured to retract with respect to the frame 12 such as to pivot at pivot 21, or be removed entirely, such that a child can walk into, or be placed in, the area within frame 12 and be positioned over, or seated in, the sling seat 14. A recessed connection member 23 coupled to the right vertical segment 22 selectively receives and couples to a distal end 25 of front member 20 to provide a closed frame 12. The seat 14 is flexible to provide comfort to the user and support torso of the user when seated thereon, where the seat and may be comprised of fabric or plastic for instance. The member 20 is then positioned back to a closed position to enclose the child within the frame 12.

Figure 2:
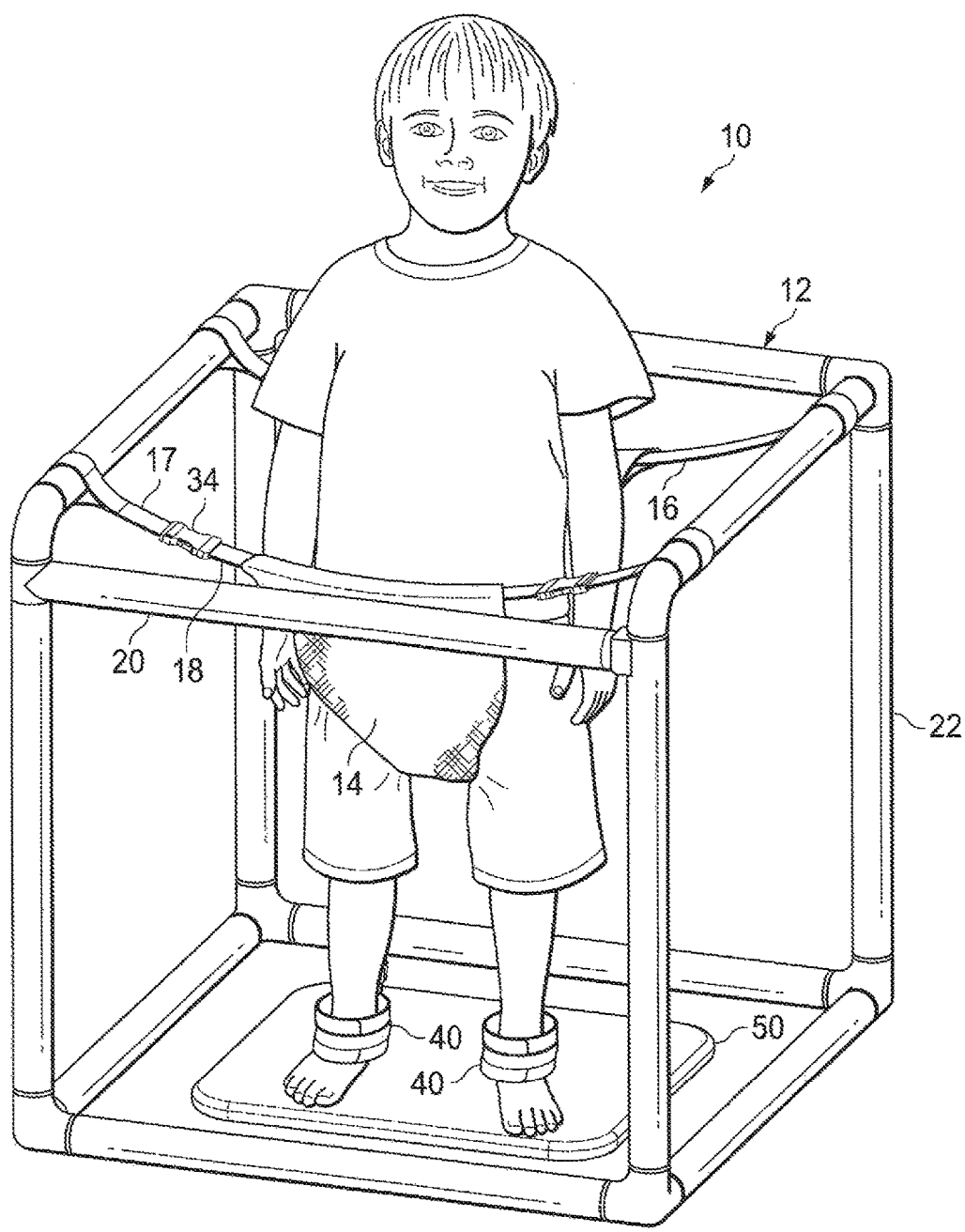
FIG. 2 illustrates a child positioned in the frame, standing on a movable game board of a video game system.

In one embodiment, the frame 12 is comprised of a plurality of 2-inch pipe segments 22 forming a central space and configured to provide mechanical stability. Each pipe segment 22 is securely connected to other segments 22 via an elbow joint generally shown at 24. For clarity, only two elbow joints 24 are shown in FIG. 1, with it being understood that there is an elbow joint 24 at the corners of the frame 12 to secure the intersecting pipe segments 22. The top segments 22 and member 20 form a rim portion configured to extend around a child standing in the frame, as shown in FIG. 2. Each end of the elbow joint 24 has 2-inch openings configured to receive the pipe segments 22 in a friction fit arrangement. The frame 12 provides stability to allow a child to grasp and play within the frame 12, but the child should never be left unattended when in the frame 12.

In one embodiment, the inside of the frame 12 consists of 3 main parts. The first part is the belts 16, 17 and 18 that hold up the seat 14. These belts 16, 17 and 18 are placed parallel to the open front of the frame 12. Each belt 16 and 17 has respective opposing ends sewn around the top end pipe segments 22, shown as pipe segments 22A and 22B in FIG. 1, to form a respective loop 32 as shown in FIGS. 1 and 2. The loops 32 are configured to allow the belts 16 and 17 to selectively slide forward and rearward along the length of the end pipe segments 22A and 22B, and also provide seat stability. As shown, the front belts 17 each have an extra piece comprising an intermediate buckle 30 that allows the belts 17 to open and detach from opposing buckles 34 at the ends of belt 18. The buckles 30 are placed near the left top end pipe segment 22A and 22B and can clip and unclip from buckles 34 disposed at each end of belt 18 to allow the seat 14 and allow children to walk into the frame 12 as seen in FIG. 1. The back belt 16 is positioned through a rear loop 36 formed in the rear portion of the seat 14.

The next part is the seat 14. The seat 14 is comprised of a generally rectangular shape or in the shape of an hour glass as shown, where each of the front end and the back end of the seat 14 are folded over the respective belt 16 and 18 and then sewn back onto itself in the back to form the rear loop 36. At the front, the seat 14 is folded over the belt 18 and sewn back onto itself to form front loop 37.

The third part comprises two elongated members comprising strong flat straps 38 each having a top end connected to, such as sewn to, and hanging from the underside of seat 14 at a midsection thereof. The opposing ends of the straps 38 each have a buckle 39 selectively coupled to a respective ankle cuff 40. The cuffs 40 are configured to receive, and wrap around, the child's ankles. The ankle cuffs 40 are adjustable to selectively and tightly fit around the child's ankle as seen in FIG. 2. The straps 38 are adjustable in length by adjustment at respective buckles 39. In an alternative embodiment, the straps 38 may have a buckle configured to selectively detach the straps from the bottom of the seat. This allows the ankle straps 38 to be disconnected for a child that does not need them. The cuffs 40 may also be positioned to receive a thigh, knee or lower leg portion of the child to constrain the child's leg.

This support device 10 has been tested with children who have physical disabilities to allow them to be positioned over a movable game board 50 of a video game system, such as the rocker board of a Wii® system manufactured by Nintendo®. A child was tested having muscular dystrophy, where he could walk alone but was unsteady, was a fall risk, and gets easily fatigued. The member 20 was retracted and the belts 17 were unbuckled, the seat 14 dropped, so he was able to walk into the central space of the frame member 12. Then, the seat 14 was brought up under him between his legs and then the belts 17 and 18 were buckled in front of him using buckles 30/34. The child can become easily fatigued, and the seat 14 allows the child to selectively sit down in between games to rest. The seat 14 is also able to catch the child if the child falls off the board.

For children with a spinal cord injury, the child may only be able to walk and stand with assistance of a walker, another stable device, or a person. A child was tested twice, once with his walker and once with the support device 10. It was proven that the support device 10 is more successful than a walker in allowing the child to operate the control board of the game system. While the walker is a simple walker with no extra straps or pieces, the walker did not provide enough room for the child to reach his maximum potential. When using the support device 10, the child was able to walk his walker up to the support device 10 and then walk straight into the central space of the frame member 12, then have the seat raised between his legs and the belts 17 and 18 buckled around him. When using the support member 10, this child does experience some spasticity and used the ankle restraints 40 to keep his balance and his legs under him. Both children showed success in using the support member 10 and were excited to use it again.

I claim:

1. A support member for a disabled child, comprising:
   a frame configured to rest upon the ground and having a base member, an upper rim portion, and a support member interposed between the rim portion and the base member configured to support the rim portion, wherein the frame defines a central space configured to receive a child in a standing position; and
   a harness coupled to the frame and supported above the ground, the harness having a seat configured to support the weight of the child, and further comprising a leg support extending from a lower portion of the seat and configured to be securely coupled about a leg of the child and restrain the leg within the central space.

2. The support member as specified in claim 1 wherein the rim portion further comprises a retractable member configured to be selectively retracted away from the rim portion to allow the child to walk into the central, space, and then be closed upon the child being positioned in the central space, wherein the rim portion has a height above the ground configured to allow the child to grasp the rim portion in the standing position for support when positioned in the central space.

3. The support member as specified in claim 2 wherein the rim portion is configured to completely encompass the child when the child is positioned in the central space such that the child can grasp the rim in multiple positions.

4. The support member as specified in claim 3 wherein the rim portion forms a rectangular shape, and the retractable member forms one side of the rim portion.

5. The support member as specified in claim 1 wherein the leg support comprises at least one cuff configured to be securely positioned around an ankle of the child.

6. The support member as specified in claim 5 wherein the leg support comprises a strap and a cuff, and including a buckle selectively coupling the cuff to the strap.

7. The support member as specified in claim 5 comprising two said leg supports, each of the two leg supports configured to be securely positioned around the ankle of the child.

8. The support member as specified in claim 1 wherein the leg support is configured to be securely positioned around a thigh of the child.

9. The support member as specified in claim 1 wherein the leg support extends downwardly from a middle portion of the seat.

10. The support member as specified in claim 1 wherein the seat comprises a sling seat.

11. The support member as specified in claim 1 wherein the harness is configured to be selectively opened to receive a leg of the child, and then secured in a closed position about the leg.

12. The support member as specified in claim 11 wherein the harness comprises at least one first, strap selectively extending between a front of the seat at one end and the frame at the opposing end.

13. A support member for a disabled child, comprising:
   a frame configured to rest upon the ground and having a base member, an upper rim portion, and a support member interposed between the rim portion and the base member configured to support the rim portion, wherein the frame defines a central space configured to receive a child in a standing position; and
   a harness coupled to the frame and supported above the ground, the harness having a seat configured to support the weight of the child, and further comprising a leg support configured to be securely coupled about a leg of the child and restrain the leg within the central space;
   wherein the harness comprises two first said straps each selectively extending between the front of the seat at one end and the frame at the opposing end, where the two first straps are securable to different opposing portions of the frame.

14. A support member for a disabled child, comprising:
   a frame configured to rest upon the ground and having a base member, an upper rim portion, and a support member interposed between the rim portion and the base member configured to support the rim portion, wherein the frame defines a central space configured to receive a child in a standing position;
   a harness coupled to the frame and supported above the ground, the harness having a seat configured to support the weight of the child, and further comprising a leg support configured to be securely coupled about a leg of the child and restrain the leg within the central space;
   wherein the harness is configured to be selectively opened to receive a leg of the child, and then secured in a closed position about the leg;
   wherein the harness comprises at least one first strap selectively extending between a front of the seat at one end and the frame at the opposing end; and
   further comprising a second strap extending between a rear portion of the seat and the frame.

15. The support member as specified in claim 14 wherein the seat comprises a sling seat.

* * * * *